US012737411B2

(12) United States Patent
Docherty et al.

(10) Patent No.: US 12,737,411 B2
(45) **Date of Patent: *Sep. 15, 2026**

(54) CONTENT RECOMMENDATION SYSTEM AND METHOD

(71) Applicant: ThinkAnalytics Ltd., Glasgow (GB)

(72) Inventors: Peter Docherty, Glasgow (GB); Christopher McGuire, Glasgow (GB); Xiaowei Zhang, Glasgow (GB); Richard Dowling, Glasgow (GB); Craig Palmer, Redondo Beach, CA (US)

(73) Assignee: ThinkAnalytics Ltd., Glasgow (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/088,968

(22) Filed: Mar. 24, 2025

(65) Prior Publication Data

US 2025/0225172 A1 Jul. 10, 2025

Related U.S. Application Data

(63) Continuation of application No. 18/130,899, filed on Apr. 4, 2023, now Pat. No. 12,277,161.

(51) Int. Cl.
*G06F 7/00* (2006.01)
*G06F 16/00* (2019.01)
*G06F 16/435* (2019.01)

(52) U.S. Cl.
CPC .................................. *G06F 16/435* (2019.01)

(58) Field of Classification Search
None
See application file for complete search history.

(56) References Cited

U.S. PATENT DOCUMENTS 6,567,814 B1 5/2003 Bankier et al.
7,805,129 B1 9/2010 Issa et al.
(Continued)

FOREIGN PATENT DOCUMENTS

EP 1 317 143 A1 6/2003
EP 2 207 348 A2 7/2010
(Continued)

*Primary Examiner* — Tuan A Pham
(74) *Attorney, Agent, or Firm* — Foley & Lardner LLP

(57) ABSTRACT

A computer-implemented method of providing one or more content item recommendations for a user of a content distribution system, comprising: determining if a user search using a title of content finds the title of content in one or more content sources available to the user; identifying, in response to the title of content not being found in the one or more content sources, content in a content library by determining if the title of content is in the content library, wherein the content library contains metadata concerning items of content in the content library, the metadata representing at least some properties of the items of content; using, in response to the title of content being determined to be in the content library, the metadata of the identified content in the content library and metadata concerning content available from the one or more content sources available to the user to generate at least one content item recommendation for the user, wherein the at least one content item recommendation is for recommended content that is related to the identified content, and providing the at least one content item recommendation to the user.

19 Claims, 5 Drawing Sheets

(56) References Cited

U.S. PATENT DOCUMENTS

| | | | |
|---|---|---|---|
| 9,699,491 B1 | 7/2017 | Docherty et al. | |
| 9,756,390 B1 | 9/2017 | Docherty et al. | |
| 9,906,837 B1 | 2/2018 | Docherty et al. | |
| 9,973,797 B1 | 5/2018 | Docherty et al. | |
| 10,091,555 B1 | 10/2018 | Docherty et al. | |
| 10,289,739 B1 | 5/2019 | Docherty et al. | |
| 10,356,035 B1 | 7/2019 | Gravino et al. | |
| 10,412,454 B2 | 9/2019 | Docherty et al. | |
| 11,212,584 B2 | 12/2021 | Docherty et al. | |
| 11,343,573 B2 | 5/2022 | Docherty et al. | |
| 2003/0106064 A1 | 6/2003 | Plourde | |
| 2007/0157222 A1 | 7/2007 | Cordray et al. | |
| 2008/0304812 A1 | 12/2008 | Jin | |
| 2010/0005492 A1* | 1/2010 | Takano .............. | H04N 21/4668 725/116 |
| 2010/0070507 A1 | 3/2010 | Mori | |
| 2011/0243529 A1 | 10/2011 | Oryoji et al. | |
| 2014/0149344 A1 | 5/2014 | Pudipeddi et al. | |
| 2014/0279756 A1 | 9/2014 | Whitman | |
| 2015/0082330 A1 | 3/2015 | Yun et al. | |
| 2015/0100987 A1 | 4/2015 | Whitman et al. | |
| 2015/0269488 A1 | 9/2015 | Galai et al. | |
| 2017/0311015 A1 | 10/2017 | Docherty et al. | |
| 2019/0364338 A1* | 11/2019 | Docherty ........... | H04N 21/4756 |
| 2020/0252690 A1* | 8/2020 | Docherty ........... | H04N 21/4147 |

FOREIGN PATENT DOCUMENTS

| | | |
|---|---|---|
| GB | 2 574 581 A | 12/2019 |
| WO | WO-01/15449 A1 | 3/2001 |
| WO | WO-02/27526 A1 | 4/2002 |
| WO | WO-2008/042242 A2 | 4/2008 |
| WO | WO-2013/130834 A1 | 9/2013 |
| WO | WO-2013/186061 A1 | 12/2013 |

* cited by examiner

CONTENT RECOMMENDATION SYSTEM AND METHOD

CROSS-REFERENCE TO RELATED APPLICATIONS

This application claims the benefit of priority as a continuation to U.S. patent application Ser. No. 18/130,899, filed Apr. 4, 2023, the entirety of which is incorporated by reference herein.

FIELD OF THE INVENTION

The present invention relates to a content recommendation system and method. More particularly, the present invention relates to recommending content relating to identified content in a content library.

BACKGROUND OF THE INVENTION

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic programme guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers. It has been suggested to provide viewers with content recommendations, which may lead them more rapidly to content that may be of interest.

Content service providers do not have access to all content. A user may search for a particular item of content they are interested in and then may become dissatisfied if the content service provider cannot provide the particular item of content to them.

SUMMARY

The following are provided as examples of the present disclosure. According to a first example of the present disclosure is a computer-implemented method of providing one or more content item recommendations for a user of a content distribution system, comprising: determining if a user search using a title of content finds the title of content in one or more content sources available to the user; identifying, in response to the title of content not being found in the one or more content sources, content in a content library by determining if the title of content is in the content library, wherein the content library contains metadata concerning items of content in the content library, the metadata representing at least some properties of the items of content; using, in response to the title of content being determined to be in the content library, the metadata of the identified content in the content library and metadata concerning content available from the one or more content sources available to the user to generate at least one content item recommendation for the user, wherein the at least one content item recommendation is for recommended content that is related to the identified content, and providing the at least one content item recommendation to the user.

The metadata concerning the items of content may be obtained from a stored ontology. The stored ontology may include at least 10,000 features that can be used as metadata to represent items of content.

The ontology may include enriched versions of metadata obtained for items of content.

The at least one content item recommendation may be generated by mapping features of the metadata and weights associated with those features for the respective identified content and the content in the content library.

The method may further comprise mapping metadata ontology between the one or more content sources available to the user and the content library.

The content may comprise content of different types.

The different types of content may comprise at least some of video content, audio content, computer games, printed content, or live performances, optionally at least some of movies, TV programmes, music, podcasts, talking books, computer games, books, magazines, concerts, plays, comedy performances or sporting events.

The method may further comprise generating a plurality of content item recommendations for the user and providing the plurality of content item recommendations to the user.

The content library may be a reduced content library comprising a subset of content of an extended content library, and the method may further comprise producing the reduced content library.

The method may further comprise producing the reduced content library by matching candidate titles of content to titles of content in the extended content library, and adding the metadata of the matched content from the extended content library to the reduced content library.

The candidate titles of content may be at least one of: provided from an external source, manually produced, and prepared by reviewing user searches by a plurality of users of the content distribution system, and determining titles of content which were not found in one or more content sources available to the plurality of users during the user searches.

The reduced content library may comprise a plurality of reduced content libraries. The plurality of reduced content libraries may comprise sources of content of different types.

The reduced content library may comprise a maximum number of titles of content.

The maximum number of titles of content may be at least one of: 1,000; 5,000 and 10,000.

The method may further comprise replacing, in response to the maximum number of titles of content being reached, titles of content in the reduced content library that have not been searched for by a plurality of users of the content distribution system with titles of content that have been searched for.

The method may further comprise maintaining a static subset of titles of content in the reduced content library regardless of whether they have not been searched for by the plurality of users of the content distribution system and the maximum number of titles of content has been reached.

Method steps of the invention can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customized circuitry. Processors suitable for the execution of a computer program include central processing units (CPUs), graphics processing units (GPUs), Tensor Processing Units (TPUs), maths-co-processors and microprocessors, and any one or more processors. The processors may be single core or multi-core. Generally, a processor will receive instructions and data from a read-only memory or a random access memory or both. The essential elements of a computer are a processor for executing instructions and one or more memory devices for storing instructions and data. The processor may be provided as part of a cloud computing resource, which is network connected and may comprise one or more computer systems, such as servers, and one or more data storage devices. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

According to a second example of the present disclosure is a system comprising processing circuitry configured to: determine if a user search using a title of content finds the title of content in one or more content sources available to the user; identify, in response to the title of content not being found in the one or more content sources, content in a content library by determining if the title of content is in the content library, wherein the content library contains metadata concerning items of content in the content library, the metadata representing at least some properties of the items of content; use, in response to the title of content being determined to be in the content library, the metadata of the identified content in the content library and metadata concerning content available from the one or more content sources available to the user to generate at least one content item recommendation for the user, wherein the at least one content item recommendation is for recommended content that is related to the identified content, and provide the at least one content item recommendation to the user.

The system may comprise middleware or a computer system configured to provide services to a provider of a user content selection interface. The user content selection interface may be provided by a computer system of the provider or on behalf of the provider. The provider may be the provider of content, such as but not limited to a television channel. The middleware or intervening computer system may be a cloud based system. The middleware or intervening computer system may be a network connected computer system and may be configured to communicate with one or both of: the computer system of the provider and/or the user devices over the network. In other examples, the system is comprised in a computer system of a provider, i.e. of a content provider. The system may be a distributed computer system or may be a unitary computer system.

The system may be configured to implement at least part or all of the method of the first example. The system may comprise a device, such as a cloud computing resource or other network enabled device, comprising or configured to implement the system of the second example. The controller or processing system may be implemented by a suitable program or application running on the device. The device may comprise at least one processor, such as a central processing unit (CPU), maths co-processor (MCP), graphics processing unit (GPU), tensor processing unit (TPU) and/or the like. The at least one processor may be a single core or multicore processor. The device may comprise memory and/or other data storage, which may be implemented on DRAM (dynamic random access memory), SSD (solid state drive), HDD (hard disk drive) or other suitable magnetic, optical and/or electronic memory device. The at least one processor and/or the memory and/or data storage may be arranged locally, e.g. provided in a single device or in multiple devices in in communication at a single location or may be distributed over several local and/or remote devices. The device may comprise a communications module, e.g. a wireless and/or wired communications module. The communications module may be configured to communicate over a cellular communications network, Wi-Fi, Bluetooth, ZigBee, near field communications (NFC), IR, satellite communications, other internet enabling networks and/or the like. The communications module may be configured to communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network. The communications module may be configured to communicate via optical communications such as optical wireless communications (OWC), optical free space communications or Li-Fi or via optical fibers and/or the like. The device and/or the controller or the at least one processor or processing unit may be configured to communicate with the remote server or data store via the communications module. The controller or processing unit may comprise or be implemented using the at least one processor, the memory and/or other data storage and/or the communications module of the device.

According to a third example of the present disclosure is a non-transitory computer-readable medium that comprises computer-readable instructions that are executable to provide one or more content item recommendations for a user of a content distribution system, the provision comprising: determining if a user search using a title of content finds the title of content in one or more content sources available to the user; identifying, in response to the title of content not being found in the one or more content sources, content in a content library by determining if the title of content is in the content library, wherein the content library contains metadata concerning items of content in the content library, the metadata representing at least some properties of the items of content; using, in response to the title of content being determined to be in the content library, the metadata of the identified content in the content library and metadata concerning content available from the one or more content sources available to the user to generate at least one content item recommendation for the user, wherein the at least one content item recommendation is for recommended content that is related to the identified content, and providing the at least one content item recommendation to the user.

The individual features and/or combinations of features defined above in accordance with any aspect of the present invention or below in relation to any specific embodiment of the invention may be utilized, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

Various aspects of the invention will now be described by way of example only, and with reference to the accompanying drawings, of which.

DETAILED DESCRIPTION

In TV systems, or other systems for provision of content to a user, each service provider may have thousand, tens or hundreds of thousands, or millions of customers, wherein each customer is unique and may have different viewing habits and preferences. It has been recognised that each may require different content recommendations. Furthermore, in order to accommodate the range of tastes and interests of such a large customer base, and to keep those customer's interest, the service provider will often provide an extensive range of different content. However, the sheer volume of content available from service provider systems can present difficulties in identifying content that the user would like to access and view. The content available to a user can be stored in a content database of a service provider, but if a user cannot readily identify content of interest, then the user may get frustrated or may not fully realize the beneficial content available to them. As such, systems for allowing users to better identify the content available from a content provider would be beneficial.

Tracking, recording and processing large volumes of customer data together with large amounts of content data in order to provide a personalised recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with millions of content recommendation demands per minute during busy periods.

Figure 1:
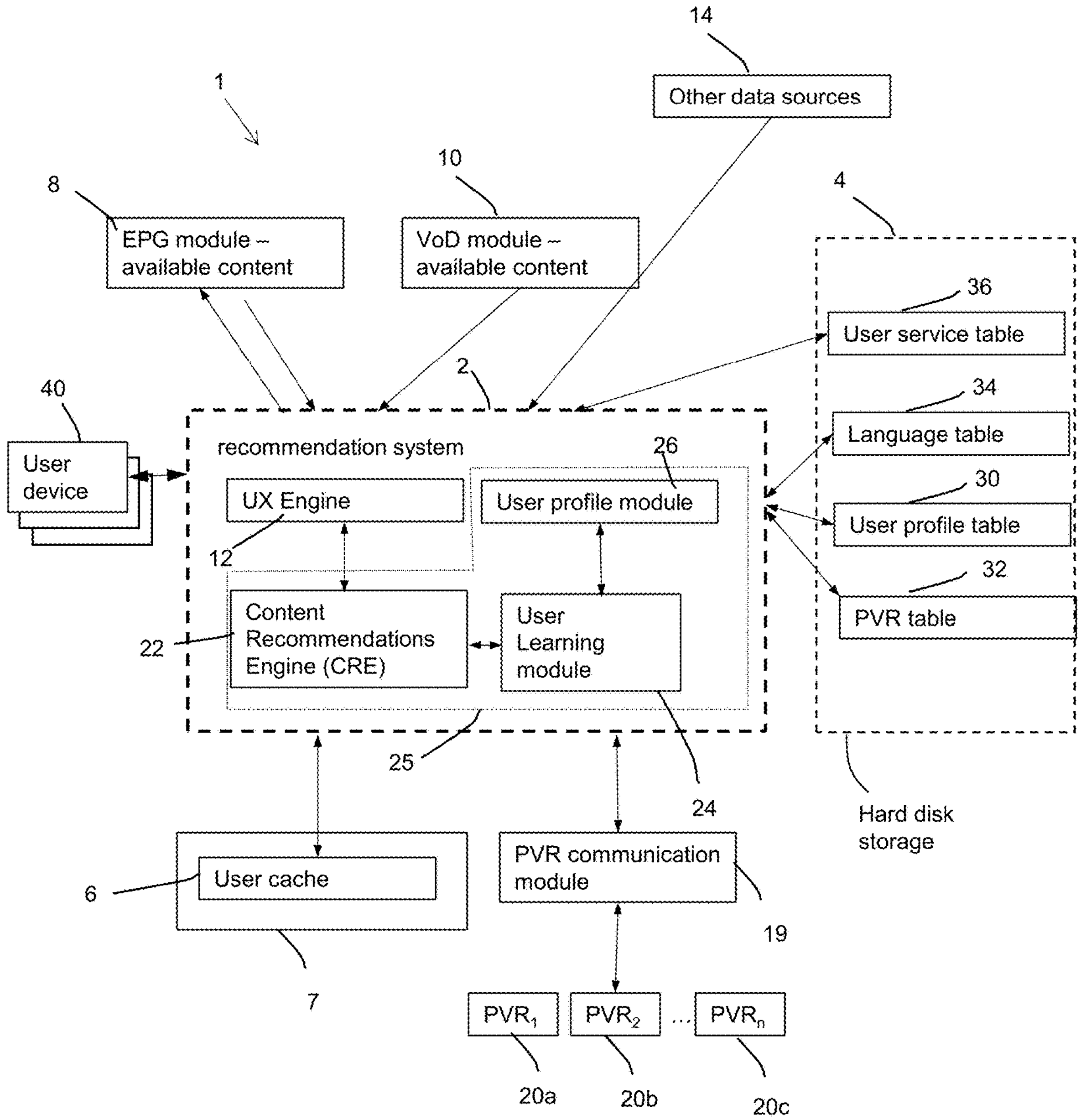
FIG. 1 is a schematic diagram of a content recommendation system.
Figure 2:
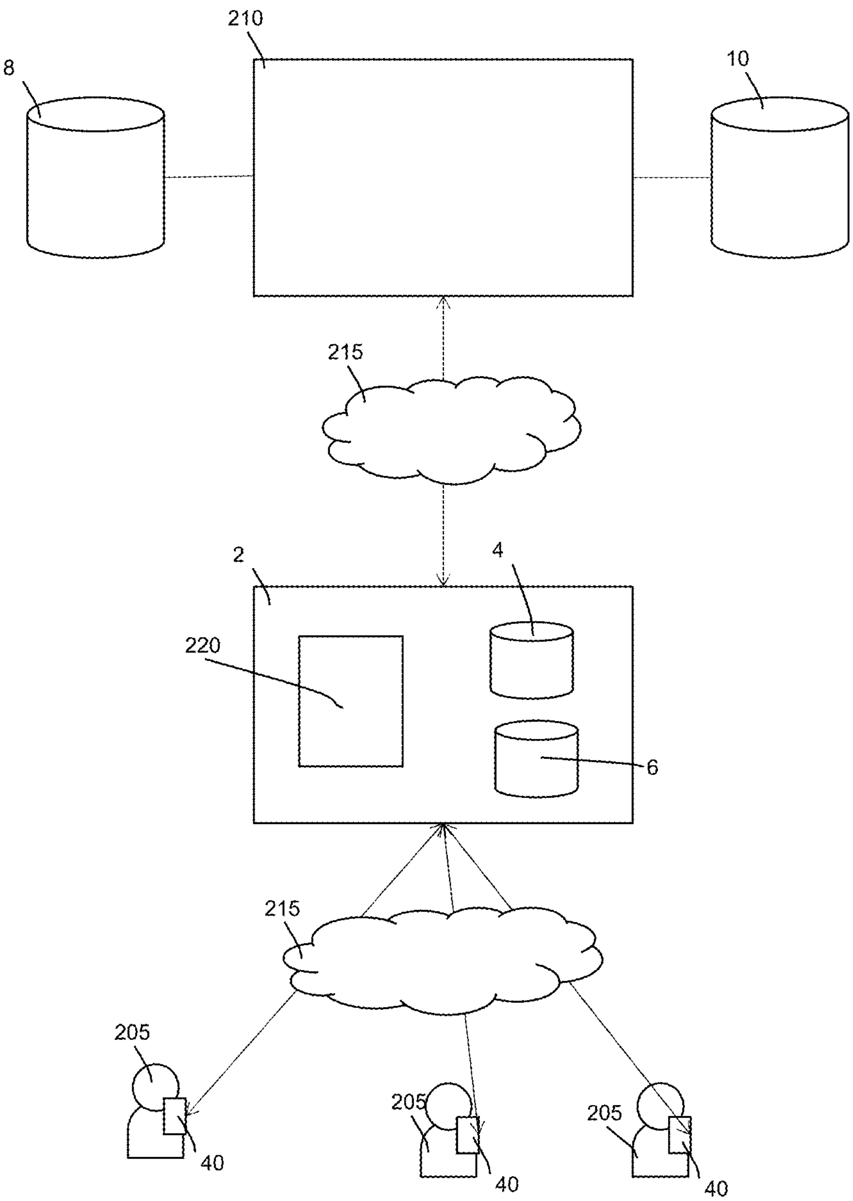
FIG. 2 is a simplified schematic of the system of FIG. 1.
Figure 3:
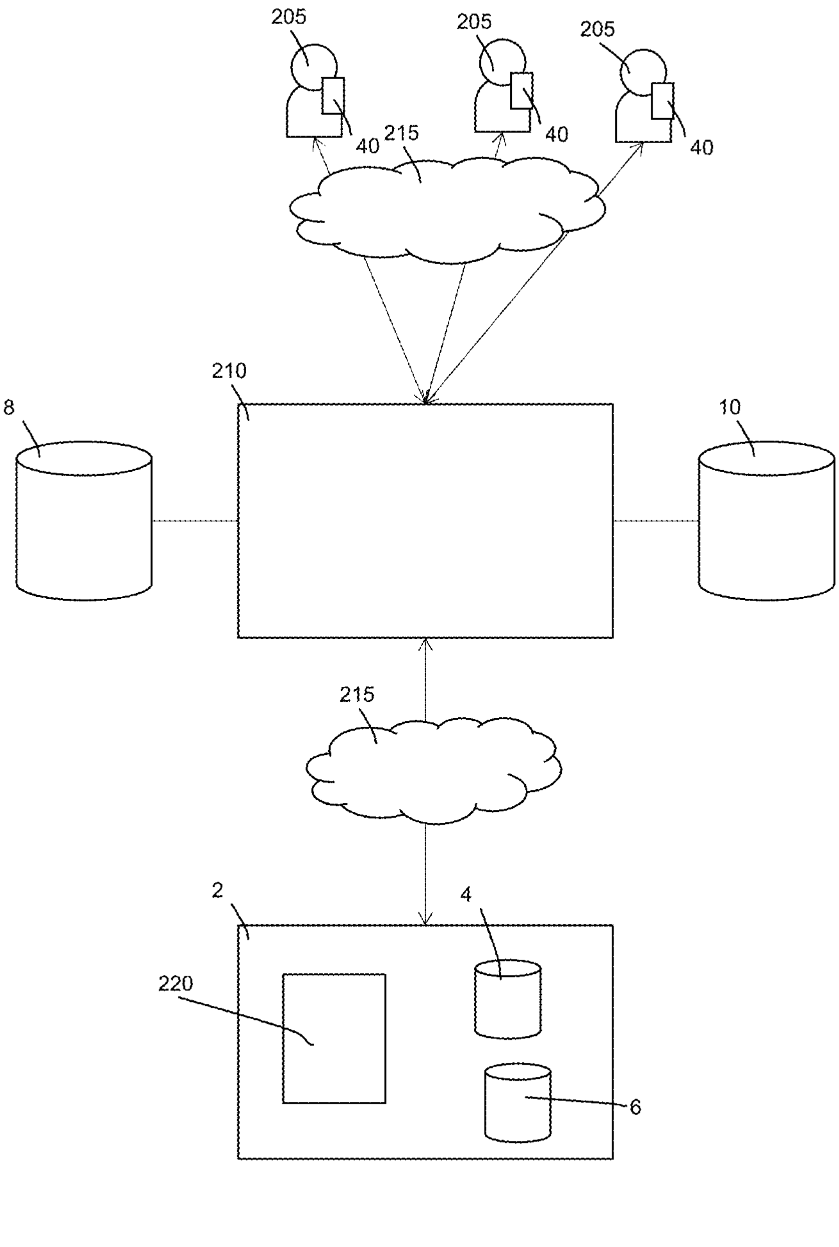
FIG. 3 is a simplified schematic of an alternative system arrangement to that of FIG. 2.

FIG. 1 shows a schematic diagram of a system 1 that comprises a user experience (UX) engine 12 for providing a user search interface that allow users 205 (see FIGS. 2 and 3) to search for content and ultimately allow recommendations to content from a content service provider (210, also shown in FIGS. 2 and 3). In particular, the user experience (UX) engine 12 can be used to search for content (e.g. a title of content) in one or more content sources available to the user (e.g. in a content database of a content service provider). The user experience (UX) engine 12 can determine if the title of content searched for is found in the content source. If the title of content is not found in the content source, then a recommendation can be made for other content that is similar to the content that has been searched for. Thus, even if is not what the user 205 searched for, content that is more likely to be of interest to the user 205 may be presented, e.g. in preference to content that may be less likely to be of interest to that user 205.

In the example of FIG. 1, the user experience (UX) engine 12 is provided as part of a more general recommendation system 2 that comprises a content recommendation engine (CRE) 22 that can apply a set of processes to determine, in real time, content recommendations for a user 205 based on user data and available content. This arrangement can be beneficial as there may be some cross-over in the data utilized such that the UX engine 12 can in some examples share or otherwise leverage data used by the CRE 22, which can minimize data storage and other services required to operate both systems. However, the disclosure is not limited to this arrangement and in other examples the UX engine 12 can be provided as a dedicated stand-alone system or as part of a content provider's user interface system or in another suitable component of a content provision system or associated support system.

The content recommendation engine (CRE) 22 in this example may be provided as part of an affinity profile generation system, which is operable to generate affinity profiles for users 205 based on first party data in the form of, for example, user actions performed in relation to their selection, viewing and other actions in relation to TV content provided by a TV distribution system, and/or in relation to other content. The recommendation system 2 in the embodiment of FIG. 1 may be able to generate affinity profiles as well as being able to provide content recommendations to users. Content recommendations may be provided in real time or near real time for tens of thousands, hundreds of thousands, or even millions of users, for example using techniques as described in UK Patent No. GB 2574581 or U.S. Pat. No. 11,343,573, the content of each of which is incorporated herein by reference. However, as noted above, this is an optional arrangement, and the UX engine 12 need not be provided as part of such a recommendation system 2 and can be provided as a stand-alone system or as part of a system with other functionality.

Some example modes of operation are described below in relation to PVRs associated with users, but content may be provided or accessible via any suitable devices, for example set-top boxes, smartphones, PCs or tablets or any other suitable content delivery mechanism.

As noted above, the system 1 in the embodiment of FIG. 1 comprises the recommendation system 2 that includes the content recommendation engine (CRE) 22, the UX engine 12 and a user profile module 26, each of which is linked to a first storage resource in the form of a hard disk storage device 4, which is used to store various user data, including user actions. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

As discussed further below, recommendation system 2 is able to communicate, either directly or indirectly, and either via wired or wireless connection, with very large numbers of users 205 or user devices 40 and to provide recommendations for or derived from such users 205 or their user devices 40. Other than some PVRs which are shown schematically in FIG. 1, only a few user devices 40 are shown in FIG. 1 for clarity, but it will be appreciated that more or less user devices 40 could be present. The user devices 40 could include, as examples only, a user's mobile phone, smart TV, tablet computer, laptop, smart watch or other suitable viewing device. Although the user devices 40 could belonging to the user 205, they could also comprise any other device that the user 205 is logged into.

The recommendation system 2, and specifically the CRE 22, the UX engine 12 and the user profile module 26 are also linked to sources of information concerning available content, in this case an EPG module 8 and a Video-on-Demand (VOD) module 10 which provide information about content available to a user 205 from a service provider system 210 (see FIGS. 2 and 3) via an EPG (for example, scheduled TV programs on a set of channels) and via a VoD service. In alternative embodiments, a variety of other sources of content may be available as well as, or in addition to, EPG and VoD content, for example internet content and/or any suitable streamed content via wired or wireless connection. The EPG is provided as an example of a content selection interface that allows users 205 to look for content available from the service provider and to select content, e.g. for download, streaming and/or viewing. However, the present disclosure is not limited to EPGs and could also be applied to other content selection interfaces, e.g. for music provision services, audio book services, film streaming services, creator content, book or article selection interfaces, amongst others. The content may comprise video, audio, text, images, or other data.

In the embodiment of FIG. 1, the EPG module 8, the UX engine 12, the user profile module 26, the VoD module 10, the CRE 22, the user cache 6, a PVR communication module 19, and a user learning module 24 are implemented in a server. The server includes communication circuitry that enables communication between the server, or appropriate components of the server, with each of the user devices 40, and with the content sources, for example a TV service operator or other content service operator. However, other arrangements are possible, e.g. one or more of the above components may be distributed over other system or more generally in the cloud.

Any other suitable implementation of the EPG module 8, the VoD module 10, the UX engine 12, the user profile module 26, the content recommendation engine (CRE) 22, the user cache 6, the PVR communication module 19, and the user learning module 24 may be provided in alternative embodiments, for example they may be implemented in any software, hardware or any suitable combination of software and hardware. Furthermore, in alternative embodiments any one of the components described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television program metadata. The metadata may be representative of a variety of different content parameters or properties, for example but not limited to program title, time, duration, content type, program categorization, actor names, genre, release date, episode number, series number. It is a feature of the embodiment that the metadata stored at the EPG module 8 and the VoD module 10 may also be enriched with additional metadata, for example by the operator of the system, such that additional metadata to that provided by the content sources or other external sources may be stored.

In the embodiment of FIG. 1 the system 1 operates together with three sources of content for a user device 40: real-time linear television, for example terrestrial or satellite broadcast television; one or more video-on-demand (VOD) services, and pre-recorded video content stored on one or more personal video recorders (PVR). In alternative embodiments further sources of content as well as or instead of those shown may be used.

The operation of the system 1 is controlled by the recommendation system 2. As can be seen in FIG. 1, the recommendation system 2 is configured to communicate with the one or more content information modules such as the electronic program guide (EPG) module and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. The personal video recorder (PVR) communication module 19 provides a communication interface between the one or more PVRs 20*a*, 20*b*, . . . 20*z* and the recommendation system 2.

The PVR communication module 19 of FIG. 1 is an interface between the PVRs 20*a*, 20*b*, . . . 20*z* and the affinity profile and recommendation system 2. The recommendation system 2 collects identifying information relating to the content items stored on the PVRs 20*a*, 20*b*, . . . 20*z*. Content items from the PVR of the user can then be taken into consideration in generating content recommendations.

In alternative embodiments any other data stores, for instance local storage devices, for example any storage devices included in or associated with user devices, may be used as well as or instead of PVRs. In some embodiments the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

There is description above concerning metadata or other content information that may be used by the system. Content information may, for example, include contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

The user profile module 26 is operable to use first party data obtained by an operator of the system to determine user activity profiles of individual users 205 or sets of users 205, which are representative of actions of a user 205.

The content recommendation engine (CRE) 22 can apply a set of processes to determine, in real time, content recommendations for a user 205 based on user data and available content.

The user learning module 24 receives data indicative of selections or other actions by a user 205 and builds up a set of user data, for example comprising or representing a user history or profile, which is stored in the hard disk storage 4, and which is used in generating personalized recommendations for the user 205.

The UX engine 12 allows for the user search interface to be configured, which may be at least in part responsive to input from an operative, such as an operative of a content provider service, and/or at least in part automatically, or any combination thereof.

The provision of content recommendations (in examples in which the UX engine 12 is part of a recommendation system 2) can be based on user actions, wherein at least some of those user actions include user interaction with content recommendation user interfaces. FIG. 1 shows user actions and requests for recommendations or ordering of content being communicated directly to the recommendation system 2 from the user devices 40. In addition to receiving requests for recommendations of content or ordering of groups of content, the recommendation system 2 is configured to log user activity. By logging user activity and storing activity over an extended period of time, the recommendation system 2 and the hard disk storage 4 can build up an overall picture of the actions of a plurality of users relating to their interactions with content selection interfaces. User actions are turned into learn actions by the user learning module 24 to be processed by the user profile module 26, the UX engine 12 and the content recommendation engine (CRE) 22.

The system of FIG. 1 is configured to operate with a plurality of user devices 40 each associated with at least one user 205 (e.g. belonging to the user 205 or into which the user 205 is logged in). The plurality of user devices 40 may comprise a large number of devices 40, for example thousands, tens or hundreds of thousands, or even millions of devices 40. Each user device 40 may be any device or combination of devices that is configured to enable a user to view or otherwise consume content. For example, each user device 40 may be an internet-enabled device and/or a device for providing video or other content on demand and/or a device capable of receiving a real-time linear television broadcast signal. The user device 40 may be a mobile device, for example a tablet, a smart phone or a laptop. Alternatively, the user device 40 may not be mobile, for example, an internet browser enabled computing device, a smart television or a set-top box. The user device 40 may also have an in-built or associated PVR for recording and storing content in some embodiments.

The user 205 may be a viewer of the user device 40. Alternatively or additionally, the user 205 may be a subscriber and/or customer of a service accessible through the user device 40.

The user cache 6 is coupled to the user profile module 26, the UX engine 12 and the content recommendations engine (CRE) 22, and data stored by the user cache 6 may be used by the user profile module 26, the UX engine 12 and the content recommendations engine 22. The recommendation system 2 can access data stored on the user cache 6. The user cache 6 may be provided in random access memory (RAM) 7.

The hard disk storage 4 is communicatively coupled to the recommendation system 2. The hard disk storage 4 stores data for use by the recommendation system 2, including user actions, also referred to as user activity. The hard disk storage 4 is configured to store one or more databases. Entries from the databases on the hard disk storage resource 4 can be retrieved by requests made through a data access layer. Entries in the databases may also be updated via the data access layer.

The database(s) at the hard disk storage 4 store user data that is used by the user profile module 26 to generate and update user profiles for users 205. That data can be used by the content recommendation engine (CRE) 22 to generate recommendations for content for the specific user 205 and/or can be used by the UX engine 12. In the embodiment of FIG. 1 a set of database tables is provided that store information concerning the users 205.

In the embodiment of FIG. 1, the tables may include at least one user service table 36 that represents user service requirements, and at least one user profile table 30 that includes user attribute data that may be included in a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user, the gender of the user and/or the like.

In the embodiment of FIG. 1, the tables may include various user learning tables that include data representing user 205 actions, also referred to as user activity. Examples of user 205 actions that constitute user activity that can be collected include one or more or each of: selecting content from a group of content or a related group of content; scrolling through content in a group of content or a related group of content; hovering a cursor for greater than a threshold period over a group of content or a related group of content; pausing scrolling for greater than a threshold period through groups of content whilst a group of content or a related group of content is displayed on a user interface; downloading content that is in a group of content or related group of content; having watched at least part of content that is in a group of content or related group of content; bookmarking content that is in a group of content or related group of content; browsing content that is in a group of content or related group of content; recording content that is in a group of content or related group of content; adding content that is in a group of content or related group of content to virtual shopping basket or otherwise selecting for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favorite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; and/or rating content that is in a group of content or related group of content, from amongst others.

For example, if a user 205 selects a program or other item of content from a content selection interface and views or otherwise consumes it for greater than a threshold period of time then a learn action is generated and at least one user data item for that user is stored in at least one of the tables. The data item may include various data including for example start and stop viewing time, time slot identifier, program identifier, which group of content the content belongs, at least some metadata concerning the program (although such metadata may be stored separately as content data rather than user data in some embodiments, and linked to or otherwise accessed if required, for example by the program name or other identifier). The user learning module 24 determines whether user data should be stored in the tables in respect of a particular user action or set of actions. For example, if a user only views a program for a very short period of time, for instance if they are channel surfing, then user data is optionally not stored in the user learning tables in respect of that action. User data can be stored in respect of a variety of different user actions or events, for example selecting, viewing, recording or searching for content or any of those listed above or others that would be apparent to a skilled person.

In the embodiment of FIG. 1 a large part of the user data comprises user history or user action data that represent user actions over a significant period of time. In various embodiments, there is a limit to how long user data is kept or used. For example in the embodiment of FIG. 1 after a threshold period, for example six months after being collected, items of user data are deleted. Thus, in some embodiments the user data for a particular user 205 may include only relatively recent user action data, although the amounts of data may still be substantial.

Although a particular system arrangement is shown in FIG. 1, there are various system arrangements that could be used.

FIG. 2 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Other system arrangements that provide similar functionality to customize the content selection interfaces for users are possible. FIG. 3 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user and how the content recommendations will be provided to the user, including an ordering with which to present recommended content based on the subject or subjects, to the systems of a content provider 210 for providing for that user 205.

Figure 4:
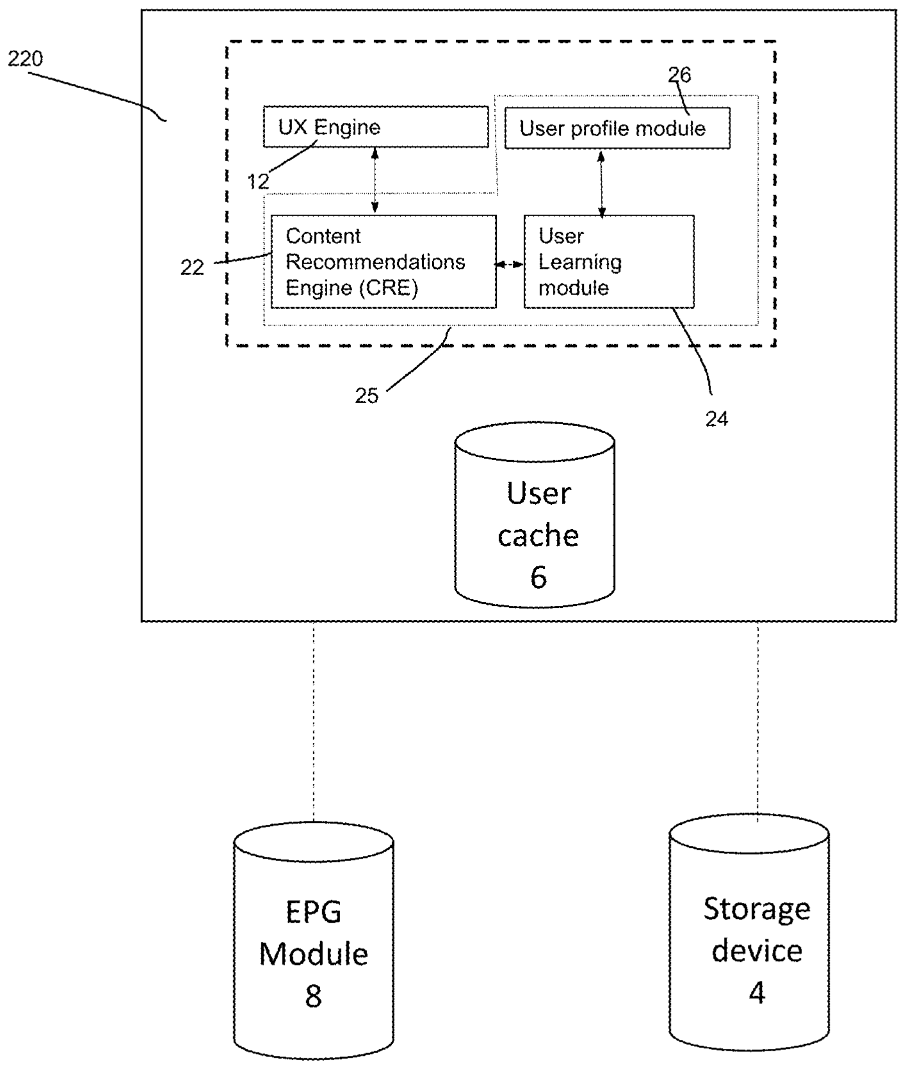
FIG. 4 is a schematic of a system for providing a content recommendation.

FIG. 4 shows an arrangement of processing resource 220 for implementing the recommendation system 2, including the UX engine 12 and in some examples also a recommendation service 25 that includes the CRE 22, the user learning module 24 and the user profile module 26. The processing resource can optionally comprise one or more processors, FPGAs, ASICS or the like, which may be provided in a single machine or distributed over a plurality of machines, and may be locally arranged or remote from each other and connected over a network. The processing resource 220 is configured to communicate with content databases, such as the EPG module 8, to retrieve content available from the content provider. The processing resource 220 comprises rapid access storage, such as user cache 6, which may be implemented in RAM or SSD storage to provide fast access to user profiles and actions that the processing resource is currently, and will next be, performing operations on. The processing resource is also configured to communicate with external storage such as storage device 4 on which user actions and profiles are stored and can be retrieved into the use cache 6 when needed by the processing resource 220. The UX engine 12 can be accessed by the operatives of the content provider (or other suitable users) to configure the content selection interface provided to user devices 40 for identifying relevant content available from the content provider.

As mentioned above, the UX engine 12 provides a search interface for users to search for desired content. In particular, the search interface allows users to search for a title of content in a content source. The user search interface may form part of a content selection interface (e.g. a customized content selection interface) or may be a separate interface for the user to make searches for content.

Metadata concerning content in the content in the content source may be held, the metadata representing at least some properties of the items of content. As mentioned, metadata of content may include a variety of different properties. These may include, e.g. title and synopsis. This metadata may be provided from the content service provider. In embodiments, a search may be performed of various data sources, for example in the cloud, to determine any other information concerning the item of content. For example, various databases can be consulted that include additional information concerning television programmes or other items of content.

In embodiments, the record for the item of content and any other information found from the search of data sources may be subject to processing by a sub-module that match the metadata and other information for the item of content to an ontology of meta data terms that are maintained by the system. Thus, the meta data for the item of content can be enriched, corrected or supplemented.

In the present embodiment the ontology consists of around 38,000 features that can be used as meta data to represent items of content. In other embodiments, it may be a different number of features (e.g. 10,000). The ontology defines features in the format <context>:<keyword>. This may be considered to be a faceted feature. Features describe the content and include subjects, settings, themes and characters (for example, Wimbledon may contain the terms-subject: tennis, sports competition: Wimbledon, theme: sports). Any other suitable ontology can be used in other embodiments. In some embodiments, no ontology is used and the raw metadata associated with the item of content (for example, provided by the content maker, distributor or broadcaster) is used without amendment or enrichment.

The metadata may include features and/or faceted features. Faceted features may be useful to disambiguate the features of the metadata. Examples may be team: Chelsea F.C, location: Chelsea F.C.

In embodiments, metadata may be obtained from data related to the content such as title, synopsis/short description, subtitles/closed caption text, full article text, other audio/visual data, textual data that has been converted from audio.

Figure 5:
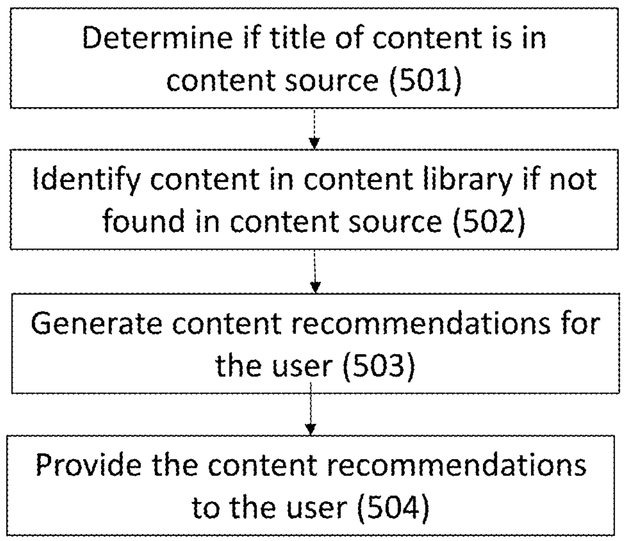
FIG. 5 is a flow chart of a method of recommending content using content searched for by the user.

FIG. 5 give examples of methods of operation of the UX engine 12 and content recommendation engine (CRE) 22 to provide content recommendations (e.g. automatically) to the user based on the content (e.g. the title of content) searched for by the user.

In step 501, the UX engine 12 determines whether content searched for in a user search (e.g. using a title of content) is in a content source (or sources) available to the user. That is, it is determined if the content (e.g. the title of content) searched for by the user (e.g. using the title of content) is in the content source (or sources) available to the user. The user may search using a text search or a voice search for example. It will be appreciated that, in other embodiments, this may be carried out in a separate module or sub-module to the UX engine 12. A custom controller may be used, e.g. to check that a search result over the content database of the content service provider is empty.

In step 502, depending on whether the title of content searched for by the user is in the content source available to the user, it is determined if the title of content is in a content library. The content library is a different database from the content source available to the user. If the title of content is in the content library, then this content is identified, and may be referred to as identified content. In other words, the UX engine 12 identifies, in response to the title of content not being found in the content source (or sources) available to the user, content in the content library by determining if the title of content is in the content library. The content library contains metadata concerning items of content in the content library, the metadata representing at least some properties of the items of content. The content library does not just contain titles of content, it also contains title and the associated metadata (which may be enriched metadata). It will be appreciated that, in other embodiments, this step may be carried out in a separate module or sub-module to the UX engine 12.

In step 503, depending on whether the title of content searched for by the user is the content library, the metadata of the identified content in the content library are used with metadata concerning content available from the content source or sources (e.g. in a content database of service provider) to (e.g. automatically) generate the content recommendations for the user in the content recommendation engine (CRE) 22. The content available from the one or more content sources (e.g. a content database) is available for the user to watch or otherwise consume. The content recommendations are for recommended content that is related to the identified content.

The content item recommendations are generated by mapping features of the metadata and weights associated with those features for the respective identified content and the content in the content library. In particular, the features of the metadata of the identified content are mapped onto the features of the metadata of the content available to the user from the content source or sources, the features of the identified content and the content available to the user and the content in the content library having associated weights. Dependent on whether the features of metadata of the identified content are also the features of the metadata of the content available to the user, and the associated weights of the features, it is determined if the identified content and the content available to the user are related (e.g. similar) and should be recommended to the user or not (e.g. when compared to other items of content).

For example, if a user searches for “Mission Impossible” and Mission Impossible is not in the catalogue (content database) available to user, then the process is continued. If the content searched for is in the content database, then the user will simply be provided with the content searched for. Continuing the process, one of the features of the metadata for Mission Impossible may be Tom Cruise and this feature will have a large weight (as Tom Cruise is main star of Mission Impossible). This metadata (features and weights etc.) will then be used to search the catalogue available to the user to find related content. For example, content may be found, and then recommended, that has Tom Cruise as a feature with a large weight (e.g. where he is also the main star—e.g. “Jack Reacher”) and content that has Tom cruise as low weight (e.g. if he only has a cameo) will not be recommended or will be less likely to be recommended than Jack Reacher.

In order for this to work the metadata (e.g. enriched metadata) which is tagged onto content in the content sources available to the user should be from the same ontology as the tags in the content library so that they match. Otherwise, if the tags do not match (e.g. if content in the content source has “Romantic Comedy” as a feature and content in the content library has “Comedic Melodrama” as the corresponding feature), the metadata ontology must be mapped between the content sources available to the user and the content library. If this mapping is not carried out then relating the content in the content source to similar content in the content library would not be possible or at least would not be optimal (i.e. related recommendations will not work correctly). More specifically, for example, if the genres and subgenres from the content database of the content service provider do not match with the ones in the content library then a cross source genre mapping may be required otherwise related recommendations will not work correctly.

In step 504, the content recommendations are provided to the user. That is, content related (e.g. similar) to the content that the user searched for is recommended to the user. In embodiments, if the title of content cannot be found in the content library then the process effectively ends. In some embodiments, different content recommendations may be presented to the user (e.g. something popular) instead of the content related to the title of content searched for.

The recommendation of the content may be based on a user profile of the user. The user profile may contain information relating to user interactions. Beneficially, such user interactions may comprise first party data in the form of, for example, user actions performed in relation to their selection, viewing and other actions in relation to content such as but not limited to TV content provided by a TV distribution system or other types of content. The user profile may include e.g. features of metadata from content the user has watched and/or from content that the user has indicated that they prefer/like/given a high rating. Thus, using the information from the user profile, the content recommendations engine 22 can provide content recommendations to a user that they are likely to be interested as it is based on content they have already watched and/or interacted with.

In embodiments, content items may be recommended to users in a particular order based on the user profile. In embodiments, the method may comprise recommending content items dependent on features in the content items being in the user profile and dependent on the weights associated with those features in the user profile. For example, if a content item has a feature that is in the user profile with a relatively high weight (e.g. an indication that that feature is important to that user) or there are several features common to the user profile and the content item, then this content item may be recommended to the user. It will be understood that there may be many content items that have features in common with the user profile and these features may have different weights associated with them. Thus, an (automatic) determination is made on which are the most suitable content items to recommend to the user, and in which order, based on the features in the content item and the features and associated weights in the user profile.

In embodiments, content item recommendations may be based on collaborative techniques. Collaborative techniques take into account user profiles and/or preferences of other users that are related or have similarities to the user. For example, if another user has watched the same film as the user, then the user may be recommended a content item that the other user has watched. This allows users to be recommended with content items that they are potentially likely to be interested in, but this may also mean they are more likely to find content that they are not familiar with.

It will be appreciated that combinations may be made of more than one of these content recommendation options when the content is being recommended. For example, there may be a combination of recommending content based on related content and based on the user profile. In examples, when options are combined, one of the options may take preference over the other option or other options. Furthermore, one or more of these different options may determine the order in which content is recommended. It will be appreciated that there may be other options or ways in which the content is recommended or the content recommendations are ordered.

In embodiments, the content library may be a reduced content library. The reduced content library may include a subset of content of an extended content library. The reduced content library may be produced using methods described. In embodiments, the content library and/or the reduced content library may be referred to as an “off platform source”. That is, they are sources of content that are different to the content source provided by the content service provider. These off platform sources, particularly the extended content library, may have much more content than the content source provided by the content service provider. It will be appreciated that the content library, the reduced content library and the extended content library may all be content databases. The content library, the reduced content library and the extended content library may contain items of content from a number of content service providers and/or other sources of content.

Figure 6:
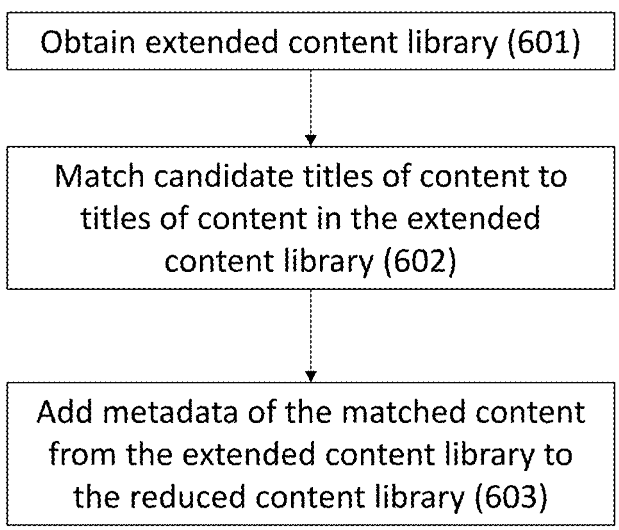
FIG. 6 is a flow chart of a method of producing a reduced content library.

FIG. 6 gives examples of methods of operation of the UX engine 12 to (e.g. automatically) produce the reduced content library. It will be appreciated that, in other embodiments, this may be carried out in a separate module or sub-module to the UX engine 12.

In step 601, an extended content library is obtained or provided.

In step 602, candidate titles of content are matched to titles of content in the extended content library. The candidate titles of content may be provided from an external source (e.g. external to the system 1). The candidate titles may be manually produced. The candidate titles may be provided by the content service provider for example. In embodiments, the candidate titles may be prepared by reviewing user searches by a plurality of users of the content distribution system, and determining titles of content which were not found in one or more content sources available to the plurality of users during the user searches. This allows the system to learn about titles (e.g. popular titles) that are not in the content source available to the users, and not initially identified by the content service provider.

In step 603, metadata of the matched content from the extended content library is added to the reduced content library. The reduced content library can then be used in place of the extended content library. It will be appreciated that the extended content library is extended in relation to the reduced content library and the reduced content library is reduced in relation to the extended content library.

The reduced content library may comprise a plurality of reduced content libraries. That is, there may be more than one reduced content library that may be used in the search for content. For example, there may a reduced content library specifically for movies and a reduced content library specifically for TV series. It will be appreciated that these are just examples and other categories may be used to form the reduced content libraries.

Furthermore, the reduced content libraries comprise sources of content of different types. For example, there may be a reduced content library specifically for video and a reduced content library for books. It will be appreciated that these are just examples and other types of content may be used to form the reduced content libraries.

In embodiments, the reduced content library may be specified to only be able to hold a maximum number of titles of content. For example, the maximum number of titles of content may be 1,000, 5,000 or 10,000. It will be appreciated that these are just examples and other maximum numbers may be used.

In embodiments, in response to the maximum number of titles of content being reached, titles of content in the reduced content library that have not been searched for by a plurality of users of the content distribution system may be replaced with titles of content that have been searched for by the plurality of users. This means that the reduced content library may maintain content that is most likely to be searched for by users (and thus content related to the content searched for is more likely to be found and recommended to the user).

In embodiments, a static subset of titles of content in the reduced content library may be maintained regardless of whether they have not been searched for by the plurality of users of the content distribution system and/or the maximum number of titles of content has been reached. This means that the at least some or all of candidate titles may be kept in the reduced content library. These may be kept in addition to those gathered from the search log files. For example, this may be important if a content service provider really wants to keep some content in the reduced content library. These titles of content that are kept in this manner may be referred to as "Editorial" titles.

Benefits to using the reduced content library over the extended content library means that it will quicker to access as there is less content, thus less content to search and match with. Content recommendations need to be provided quickly. Furthermore, some of the content in an extended content library may not be relevant at all to that user. For example, it may be in a different language to the language that the user consumes content. The extended content library may have thousands, tens of thousands, hundreds of thousands, or millions of content items from all across the world, e.g. in many different languages. It may take a long time (longer than desired when providing content recommendations) to use the content in the extended content library to generate the content item recommendations.

Content selection and/or user search interfaces can allow users to conveniently identify and select content for consumption. However, there are technical challenges posed by the likes of the sheer volume of content available and the limitations on on-screen area of many user devices for presenting the content selection interface and/or user search interface. Furthermore, being able to access and use the content selection interface and/or user search interfaces with as little lag as possible, may make overly large, complex or inefficient processes for providing the content selection interface and/or user search interfaces undesirable. Given the vast numbers of users and requests, ultra-fast response times in the order of milliseconds are highly desirable. As such, improvements in content selection interface and/or user search interfaces in order to enhance the ability of a user to search for content or related content stored by, and available from, a service provider's computer systems whilst keeping lag acceptably small may be beneficial.

Tracking, recording and processing large volumes of customer data together with large amounts of content data within reasonable time constraints and with acceptable accuracy poses a significant technical challenge. The time constraints demanded by particular content providers, or expected by users, may be particularly demanding. This can present a significant technical challenge, particularly as the system is usually hosted on one or more servers remote from the set top box or other device and, for systems with millions of subscribers, may have to deal simultaneously with millions of user actions or interactions per minute during busy periods.

It will be appreciated that the content is not limited to a particular type of content, e.g. only video content. For example, the content may be any of e.g. video content (movies, TV shows, news, live sports, etc), audio (radio/music), books, games, article (e.g. news articles) etc.

It will be appreciated that, in embodiments, the system may provide a single content recommendation or a plurality of content recommendations.

The system described herein can be used to provide content item recommendations that may in some examples be of interest to a user as an alternative when the content they have searched for is not available from a content provider system. This content that is recommended will be similar (or at least related in some way to the content they have searched for). As content more likely to be of interest may be recommended in preference to content that is less likely to be of interest, then the user can more quickly identify content of interest.

The content provider system and/or system 1 may be configured such as to restrict or not allow access to personal information, or data that could be used to determine the name of a user, or demographic information concerning the user, by the system 1.

Although various specific examples have been described above, these are provided to help understanding of the present disclosure and other possible implementations can be used. For example, although specific arrangements of systems and networks that could be used to implement the concepts disclosed herein are shown in FIGS. 1 to 3, other systems architectures could be used. For example, the UX engine 12 could be provided as a stand-alone system rather than being integrated with the content recommendation engine (CRE) 22 or integrated into a content provider system rather than being provided as a separate intermediate or backend system.

Method steps described herein can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customized circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented with a user device 40 having a screen, e.g., a CRT (cathode ray tube), plasma, LED (light emitting diode) or LCD (liquid crystal display) monitor, for displaying information (e.g. the content selection interface 605) to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

As such, the above description of specific embodiments is made by way of example only. A skilled person will appreciate that variations of the described embodiments may be made without departing from the scope of the invention.

What is claimed is:

1. A computer-implemented method of providing one or more content item recommendations for a user of a content distribution system, comprising:

determining if a user search using a title of content finds the title of content in one or more content sources available to the user, the one or more content sources having content available for the user to watch or otherwise consume;

identifying, in response to the title of content not being found in the one or more content sources in that the content searched for by the user is not available for the user to watch or otherwise consume, the content in a content library by determining if the title of content is in the content library, wherein the content library is a different database from the one or more content sources available to the user in that the content library contains content that is not available to the user to watch or otherwise consume and wherein the content library contains metadata concerning items of content in the content library, the metadata representing at least some properties of the items of content;

using, in response to the title of content being determined to be in the content library, the metadata of the identified content in the content library and metadata concerning content available from the one or more content sources available to the user to watch or otherwise consume to generate at least one content item recommendation for the user, wherein the at least one content item recommendation is for recommended content that is in the one or more content sources available to the user and has not been searched for by the user, and that is related to the identified content in that it is similar to the content that has been searched for by the user, and providing the at least one content item recommendation to the user.

2. The method of claim 1, wherein the metadata concerning the items of content is obtained from a stored ontology that includes at least 10,000 features that can be used as metadata to represent items of content.

3. The method of claim 2, wherein the ontology includes enriched versions of metadata obtained for items of content.

4. The method of claim 1, wherein the at least one content item recommendation is generated by mapping features of the metadata and weights associated with those features for the respective identified content and the content in the content library.

5. The method of claim 1, further comprising mapping metadata ontology between the one or more content sources available to the user and the content library.

6. The method of claim 1, wherein the content comprises content of different types.

7. The method of claim 6, wherein the different types of content comprise at least some of video content, audio content, computer games, printed content, or live performances, optionally at least some of movies, TV programmes, music, podcasts, talking books, computer games, books, magazines, concerts, plays, comedy performances or sporting events.

8. The method of claim 1, further comprising generating a plurality of content item recommendations for the user and providing the plurality of content item recommendations to the user.

9. The method of claim 1, wherein the content library is a reduced content library comprising a subset of content of an extended content library, and the method further comprises producing the reduced content library.

10. The method of claim 9, further comprising producing the reduced content library by matching candidate titles of content to titles of content in the extended content library, and adding the metadata of the matched content from the extended content library to the reduced content library.

11. The method of claim 10, wherein the candidate titles of content are at least one of:

provided from an external source, manually produced, and prepared by reviewing user searches by a plurality of users of the content distribution system, and determining titles of content which were not found in one or more content sources available to the plurality of users during the user searches.

12. The method of claim 9, wherein the reduced content library comprises a plurality of reduced content libraries.

13. The method of claim 12, wherein the plurality of reduced content libraries comprise sources of content of different types.

14. The method of claim 9, wherein the reduced content library comprises a maximum number of titles of content.

15. The method of claim 14, wherein the maximum number of titles of content is at least one of: 1,000; 5,000 and 10,000.

16. The method of claim 14, further comprising replacing, in response to the maximum number of titles of content being reached, titles of content in the reduced content library that have not been searched for by a plurality of users of the content distribution system with titles of content that have been searched for.

17. The method of claim 16, further comprising maintaining a static subset of titles of content in the reduced content library regardless of whether they have not been searched for by the plurality of users of the content distribution system and the maximum number of titles of content has been reached.

18. A system comprising:

a memory;

a hardware processor configured to:

determine if a user search using a title of content finds the title of content in one or more content sources available to the user, the one or more content sources having content available for the user to watch or otherwise consume;

identify, in response to the title of content not being found in the one or more content sources in that the content searched for by the user is not available for the user to watch or otherwise consume, the content in a content library by determining if the title of content is in the content library, wherein the content library is a different database from the one or more content sources available to the user in that the content library contains content that is not available to the user to watch or otherwise consume and wherein the content library contains metadata concerning items of content in the content library, the metadata representing at least some properties of the items of content;

use, in response to the title of content being determined to be in the content library, the metadata of the identified content in the content library and metadata concerning content available from the one or more content sources available to the user to watch or otherwise consume to generate at least one content item recommendation for the user, wherein the at least one content item recommendation is for recommended content that is in the one or more content sources available to the user and has not been searched for by the user, and that is related to the identified content in that it is similar to the content that has been searched for by the user, and provide the at least one content item recommendation to the user.

19. A non-transitory computer-readable medium that comprises computer-readable instructions that are executable by a process and when executed, cause the processor to perform a process comprising: determining if a user search using a title of content finds the title of content in one or more content sources available to the user;

identifying, in response to the title of content not being found in the one or more content sources in that the content searched for by the user is not available for the user to watch or otherwise consume, the content in a content library by determining if the title of content is in the content library, wherein the content library is a different database from the one or more content sources available to the user in that the content library contains content that is not available to the user to watch or otherwise consume and wherein the content library contains metadata concerning items of content in the content library, the metadata representing at least some properties of the items of content;

using, in response to the title of content being determined to be in the content library, the metadata of the identified content in the content library and metadata concerning content available from the one or more content sources available to the user to watch or otherwise consume to generate at least one content item recommendation for the user, wherein the at least one content item recommendation is for recommended content that is in the one or more content sources available to the user and has not been searched for by the user, and that is related to the identified content in that it is similar to the content that has been searched for by the user, and providing the at least one content item recommendation to the user.

* * * * *